United States Patent
Toivanen

(10) Patent No.: US 6,539,029 B1
(45) Date of Patent: Mar. 25, 2003

(54) NETWORK ACCESS SERVER CONTROL

(75) Inventor: Harri Toivanen, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/329,364

(22) Filed: Jun. 10, 1999

(30) Foreign Application Priority Data

Jun. 11, 1998 (FI) .................................................. 981354

(51) Int. Cl.⁷ .............................................. H04L 12/56
(52) U.S. Cl. ....................................... 370/466; 370/353
(58) Field of Search ................................ 370/401, 465, 370/466, 353, 352, 354

(56) References Cited

U.S. PATENT DOCUMENTS

| | | | | |
|---|---|---|---|---|
| 6,256,389 B1 | * | 7/2001 | Dalrymple et al. | 379/900 |
| 6,278,707 B1 | * | 8/2001 | MacMillan et al. | 370/352 |
| 6,324,179 B1 | * | 11/2001 | Doshi et al. | 370/395 |
| 6,327,267 B1 | * | 12/2001 | Valentire et al. | 370/466 |
| 6,335,968 B1 | * | 1/2002 | Malik | 379/114.2 |

FOREIGN PATENT DOCUMENTS

| | | |
|---|---|---|
| EP | 0 841 831 A2 | 10/1997 |
| WO | WO 96/38018 | 11/1996 |
| WO | WO 97/38551 | 10/1997 |
| WO | 97/42274 | 11/1997 |
| WO | WO 97/42774 | 11/1997 |
| WO | 98/18238 | 4/1998 |
| WO | 98/56142 | 12/1998 |
| WO | 98/56143 | 12/1998 |

OTHER PUBLICATIONS

International Search Report Date of Completion: Sep. 22, 1999; Date of Mailing: Oct. 4, 1999.

* cited by examiner

Primary Examiner—Ken Vanderpuye

(57) ABSTRACT

A method of signalling in a telecommunications network to control a set of circuit switched channels between a network exchange and an Internet Access Server, alternatively known as Network Access Server (NAS). Signalling data is transmitted between the exchange and gateway node using SS7 Protocol, the exchange and gateway node being assigned respective SS7 Point Codes. The signalling data is then transmitted between the NAS and the gateway node using Internet Protocol (IP), the gateway node and the NAS being assigned respective IP addresses. The gateway node is provided with a look-up table mapping the NAS IP address to the exchange Point of Code and a set of identifiers corresponding to said set of channels. Signalling data received at the gateway node from the exchange is routed to the NAS using the IP address for the NAS obtained from the look-up table using the Point Code of the source exchange and a channel identifier conveyed with the signaling data.

8 Claims, 3 Drawing Sheets

NETWORK ACCESS SERVER CONTROL

FIELD OF THE INVENTION

The present invention relates to the control of data network access servers and in particular, though not necessarily, to the control of network access servers connecting subscribers of a telecommunications network to a data network.

BACKGROUND TO THE INVENTION

Access to the Internet, and in particular to the World Wide Web (WWW), is usually obtained via a telecommunication network to which a user subscribes, the user interface being a Personal Computer (PC) or the like. The telecommunication network provides the user with a reserved telephone line (or rather channel) to a Network Access Server (NAS) operated by an Internet Service Provider (ISP), and a so-called Point-to-Point Protocol (PPP) connection is established between the user and the NAS. The NAS provides the user with an Internet Protocol (IP) address and acts as a protocol converter between the circuit switched transmission protocol of the telecommunications network (typically E.1 or T.1) and the packet switched Internet Protocol (usually TCP/IP).

The Network Access Servers (NAS) enable the operator of a telecommunications network to connect its subscribers directly to the WWW without the need for an external ISP. Typically, several NAS are connected to an exchange of the telecommunications network and provide functionality similar to that provided by conventional IAS. The advantage of the NAS approach is that subscribers may be charged for telephone connections and WWW access in a single bill issued by the telecommunications network. It follows that a subscriber may be billed relatively small amounts for WWW access, which could otherwise not be billed in an economical manner.

In the case of the E.1 or T.1 telecommunications network transmission protocol, a signalling protocol known as Signalling System 7 is commonly used to establish, maintain, and terminate circuit switched channels between various components of a telecommunications network. In particular, SS7 is used to control the channel between the local exchange of a subscriber, any intermediate or transit exchanges, and an IAS allocated to the subscriber. SS7 occupies one time slot per frame of the Time Division Multiple Access (TDMA) E.1 or T.1 transmission protocols (the other slots being available for user data).

SS7 makes use of addresses known as Point Codes to route signalling data through the "visibility area" of a telecommunications network, the visibility area typically being the network itself together with the interfaces between the network and "foreign" networks under the control of other operators. A Point Code is placed in the header of a signalling packet and is examined by an exchange upon receipt of the packet to determine the next hop for the packet en route to its destination.

SS7 provides for a 12 bit Point Code, i.e. 4096 possible unique addresses. This has been sufficient for conventional networks having a relatively small number of exchanges. However, with the introduction of IASs, each of which requires its own Point Code within a network's visibility area, it is likely that 4096 Point Codes will be insufficient.

SUMMARY OF THE PRESENT INVENTION

It is an object of the present invention to provide a communications network in which the above noted disadvantage is overcome or at least mitigated.

It is a second object of the invention to provide a communications network comprising data network access servers and in which each access server does not necessarily require its own signalling address within the communications network.

According to a first aspect of the present invention there is provided a method of signalling in a telecommunications network to control a set of circuit switched channels between a network exchange and a data network access server (NAS), the method comprising:

transmitting signalling data between the exchange and a gateway node using a circuit switched transmission protocol, the exchange and the gateway node being assigned respective Point Code addresses under said circuit switched transmission protocol;

transmitting signalling data between the data NAS and the gateway node using a packet switched transmission protocol, the gateway node and the NAS being assigned respective addresses under said packed switched transmission protocol;

providing a look-up table at the gateway node mapping the NAS packet switched transmission protocol address to the exchange Point Code address and a set of identifiers corresponding to said set of channels; and receiving signalling data at the gateway node from the exchange, and routing the data to the NAS using the packet switched transmission protocol address for the NAS obtained from said look-up table using the Point Code address of the source exchange and a channel identifier conveyed with the signalling data.

Embodiments of the present invention have the advantage that signalling data is routed to a data network access server using a data network address rather than a telecommunications network signalling protocol address. Thus the number of network access servers which can be used within the visibility area of the telecommunications network is significantly increased. Furthermore, it is possible to share a data network interface of the network access server for both signalling purposes and for accessing the data network itself, i.e. there is no need to provide a separate, dedicated signalling interface at the network access server.

It is envisaged that the main application of the present invention will be the connection of subscriber terminals to the Internet (and more particularly to make use of the World Wide Web (WWW)), where said packet switched signalling protocol is Internet Protocol (IP), and said data network addresses assigned to the gateway node and to the data network access server are IP addresses. Signalling data may be transmitted between the gateway node and the network access server via the WWW or via a closed connection such as a data bus connecting the exchange to the network access server.

It is also envisaged that the invention may be used to provide connections to data networks other than the WWW, for example Local Area Networks (LANs) and Wide Area Networks (WANs) in which the Signalling protocol may be IP or some other protocol.

In a preferred embodiment of the present invention, the circuit switched signalling protocol of the telecommunications network is Signalling System 7 (SS7).

Preferably, said gateway node is coupled to a plurality of exchanges, each exchange being coupled in turn to a set of NASs. Said look-up table then contains a list of the NAS packet switched transmission protocol addresses and, for each such address, the Point Code address of the associated exchange and the channel identifiers of the channels between the NAS and the exchange.

According to a second aspect of the present invention there is provided apparatus for controlling a set of circuit switched channels between a network exchange and a data network access server (NAS), the apparatus comprising:

a gateway node coupled between the NAS and the exchange;

first transmitting means for transmitting signalling data between the exchange and the gateway node using a circuit switched transmission protocol, the exchange and the gateway node being assigned respective Point Code addresses under said circuit switched transmission protocol;

second transmitting means for transmitting signalling data between the data NAS and the gateway node using a packet switched transmission protocol, the gateway node and the NAS being assigned respective addresses under said packed switched transmission protocol; and data storage means at or coupled to the gateway node and providing a look-up table mapping the NAS packet switched transmission protocol address to the exchange Point Code address and a set of identifiers corresponding to said set of channels, wherein the gateway node is arranged in use to receive signalling data from the exchange, and to route the data to the NAS using the packet switched transmission protocol address for the NAS obtained from said look-up table using the Point Code address of the source exchange and a channel identifier conveyed with the signalling data.

According to a third aspect of the present invention there is provided a gateway node of a telecommunications network, the gateway node being arranged to route signalling data to control a set of circuit switched channels between a network exchange and a data network access server (NAS), the gateway node comprising:

first input/output means for communicating signalling data between the gateway node and the exchange using a circuit switched transmission protocol, the exchange and the gateway node being assigned respective Point Code addresses under said circuit switched transmission protocol;

second input/output means for transmitting signalling data between the gateway node and the NAS using a packet switched transmission protocol, the gateway node and the NAS being assigned respective addresses under said packed switched transmission protocol;

data storage means providing a look-up table mapping the NAS packet switched transmission protocol address to the exchange Point Code address and a set of identifiers corresponding to said set of channels; and routing means for routing signalling data received from the exchange to the NAS using the packet switched transmission protocol address for the NAS obtained from said look-up table using the Point Code address of the source exchange and a channel identifier conveyed with the signalling data.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
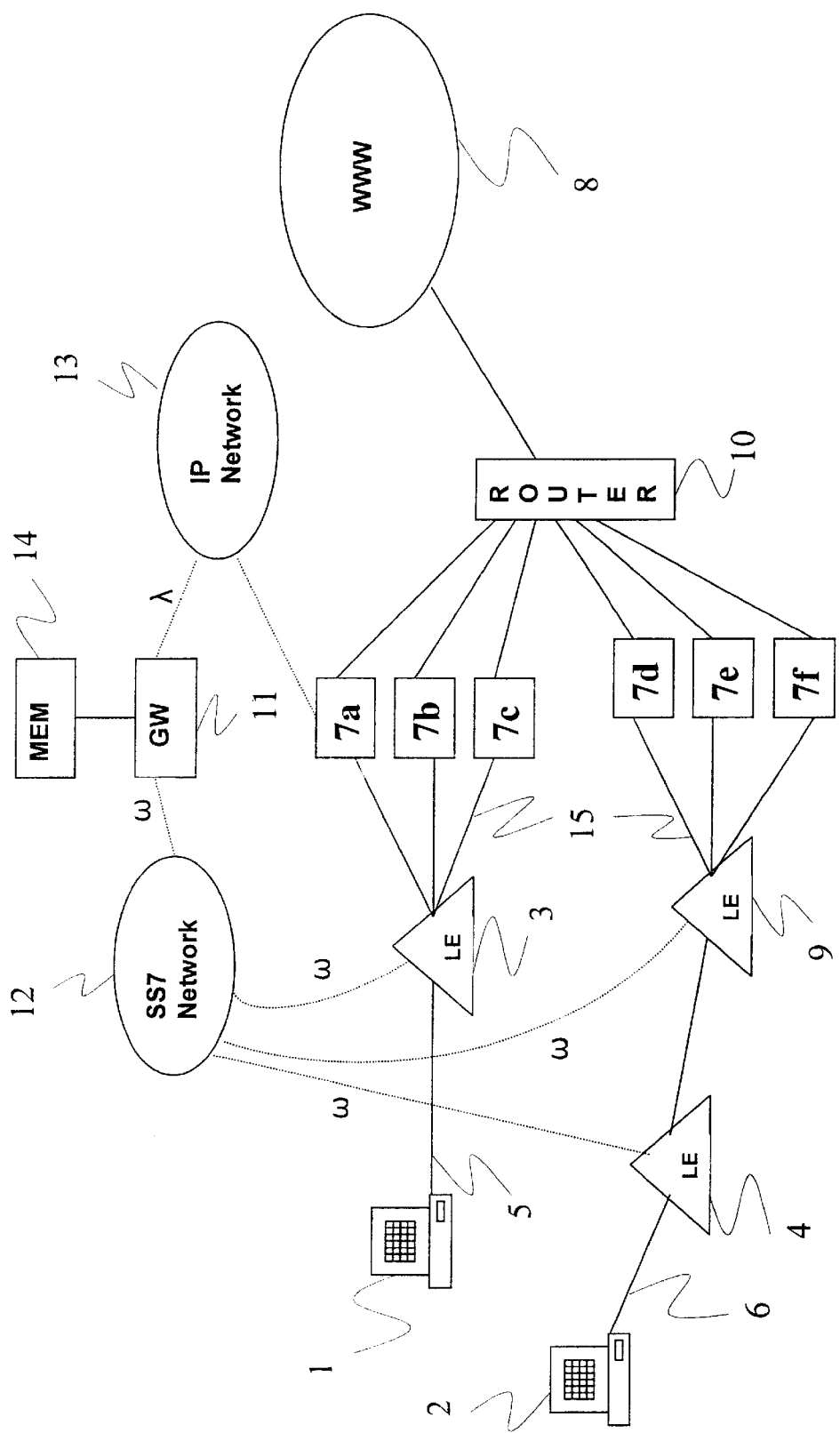
FIG. 1 shows schematically a telecommunications network including signalling connections.

It has already been described above that, a subscriber terminal may be connected to the World Wide Web (WWW) via a telecommunications network having an Internet Access Server (IAS). In FIG. 1 there is shown a pair of subscriber terminal 1,2 connected to respective local exchanges (LE) 3,4 via Integrated Service Digital Network (ISDN) lines 5,6. Connections are facilitated by modems internal to the subscriber terminal 1,2. The ISDN lines 5,6 may also connect to Intermediate concentrators, i.e. multiplexers/demultiplexers, although these are not shown in FIG. 1.

In certain cases, the local exchange of a subscriber terminal may be provided with a set of Internet Access Services (IAS), alternatively known as Network Access Server (NAS) 7a to 7c through which the subscriber terminal may access the WWW 8. This is the case for the local exchange 3 of the subscriber terminal 1. In other cases, as illustrated for the subscriber terminal 2, the local exchange 4 routes a connection to a second exchange 9 at which the necessary NASs 7d to 7f are provided. It will be appreciated that a connection may be made via one or more additional, transit exchanges. The NASs 7 are coupled to the WWW 8 via one or more routers 10 which provide multiplexing/demultiplexing between the NASs 7 and the high capacity WWW lines.

When a WWW access request is made by a subscriber terminal 1,2, e.g. by dialing a predefined access telephone number from the subscriber terminal and which is recognized by an "intelligent network" associated with one of the exchanges, a circuit switched connection must be established between the subscriber terminal 1,2 and an NAS 7 of the "terminating" exchange 3,9 (and 4 ). This circuit switched channel is carried by the corresponding ISDN line 5,6 and by a line 15 connecting the exchange 3,9 to the IAS 7. Typically, there are in the region of 300 64 Kbit/sec channels available between an exchange and one of the associated NASs 7. These channels are provided in Europe according to the E.1 transmission protocol and in America according to the T.1 transmission protocol. In either case, each of the channels has a channel identifier known as Circuit Identification Code (CIC) which is unique to the associated exchange. For example, with reference to the exchange 3 in FIG. 1, channel identifiers 0–299 may be allocated to NAS 7a, 300–599 to NAS 7b, and 600–899 to NAS 7c. The same sets of identifiers may be allocated to NASs 7d to 7f for the exchange 9.

The setting-up of a circuit switched channel to a subscriber terminal 1,2 is achieved using a gateway node (GW) 11, which provides an interface between the exchanges 3,9 and the NASs 7. More particularly, signalling messages are conveyed between the exchanges and the gateway node according to the Signalling System 7 (SS7) protocol which is defined in ITU standard series Q.700 and which is carried on top of the E.1/T.1 transmission protocol (in FIG. 1 signalling messages are illustrated using broken lines whilst the flow of user data is illustrated with solid lines). The exchanges 3,9 (and 4 ) and the gateway note 11 are allocated Point Code addresses in the SS7 network. Signalling data transmitted over the telecommunications network accompanied by the Point Code of the intended destination and the Point Code of the data source. The SS7 network is identified in FIG. 1 by the reference numeral 12 whilst SS7 messages are identified by the symbol ω. It will be appreciated that the function of the signalling system referred by numeral 12 (including transmitting and receiving SS7 messages) is distributed over the network, including the exchanges 3,9 and the gateway node 11.

Each of the NASs 7 is allocated an Internet Protocol (IP) address. The gateway node 11 is also allocated an IP address to enable signalling data to be transmitted between the gateway node 11 and the NASs 7 using a packet switched data transmission protocol such as TCP/IP, indicated in FIG. 1 by the numeral 13 (again, the functionality of the feature 13, i.e. transmitting and receiving TCP/IP messages, is distributed across the network, including the NASs and the gateway node 11 ). These IP transmissions (identified in FIG. 1 by symbol λ) are carried via dedicated lines connecting the gateway node 11 and the NASS. although only one such a line is shown in FIG. 1. The gateway node 11 acts as an interface between the SS7 data on the exchange side of the interface and pocket switched transmission protocol on the NAS side.

The gateway node 11 has an associated memory (MEM) 14 in which is stored a look-up table. This table contains a list of IP addresses allocated to the network's NASs 7. The table also contains, for each IP address, the Point Code of the exchange 31 9 to which the corresponding NAS is connected together with the range of circuit switched channel identifiers provided between the NASs and the exchange. The look-up table may therefore have the following format, where exchange 3 in FIG. 1 has the Point Code (PC) 1, exchange 9 has the Point Code 1, (NB. Column 4 is included only for the sake of reference to FIG. 1):

| IP address | Channel ID range | Source exchange PC | FIG. 1 IAS reference numeral |
|---|---|---|---|
| 123.456 | 0–299 | 1 | 7a |
| 123.457 | 300–599 | 1 | 7b |
| 123.458 | 600–899 | 1 | 7c |
| 123.459 | 0–299 | 2 | 7d |
| 123.460 | 300–599 | 2 | 7e |
| 123.461 | 600–899 | 2 | 7f |

The information held in the look-up table may be fixed, or may be updated dynamically.

Up on receipt of a WWW access request from a subscriber terminal 1,2, a controller of the terminating exchange 3,9 allocates to the terminal 1.2 a circuit switched channel to one of the associated NASs 7. The allocated NAS 7 is notified of allocation by first sending an SS7 signaling message ω from the exchange 3,9 to the gateway node 11. Included in this message are the Point Code of the gateway node (by means of which the message is routed to gateway node), the Point Code (1 or 2) of the source exchange 3,9, and channel identifier (0–899) of the allocated channel. On the basis of the latter two pieces of information, the gateway node 11 is able to determine, from its look-up table in memory 14, the IP address of the allocated NAS 7. The signaling message is then converted into the TCP format λ and is transmitted over the IP network 13 to the NAS 7 on the basis of the determined IP address.

It will already be apparent that each of the NAS 7 requires an IP interface in order to communicate with the router 10 and the WWW 8. This interface is also used to communicate with the IP network 13 and the gateway node 11. Thus, the NASs 7 require no additional SS7 interface in order to receive signalling data from the telecommunications network. Furthermore, as signalling data is routed to the NASs 7 on the basis of an IP address, there is no need to allocate to each NAS an own Point Code.

Figure 2:
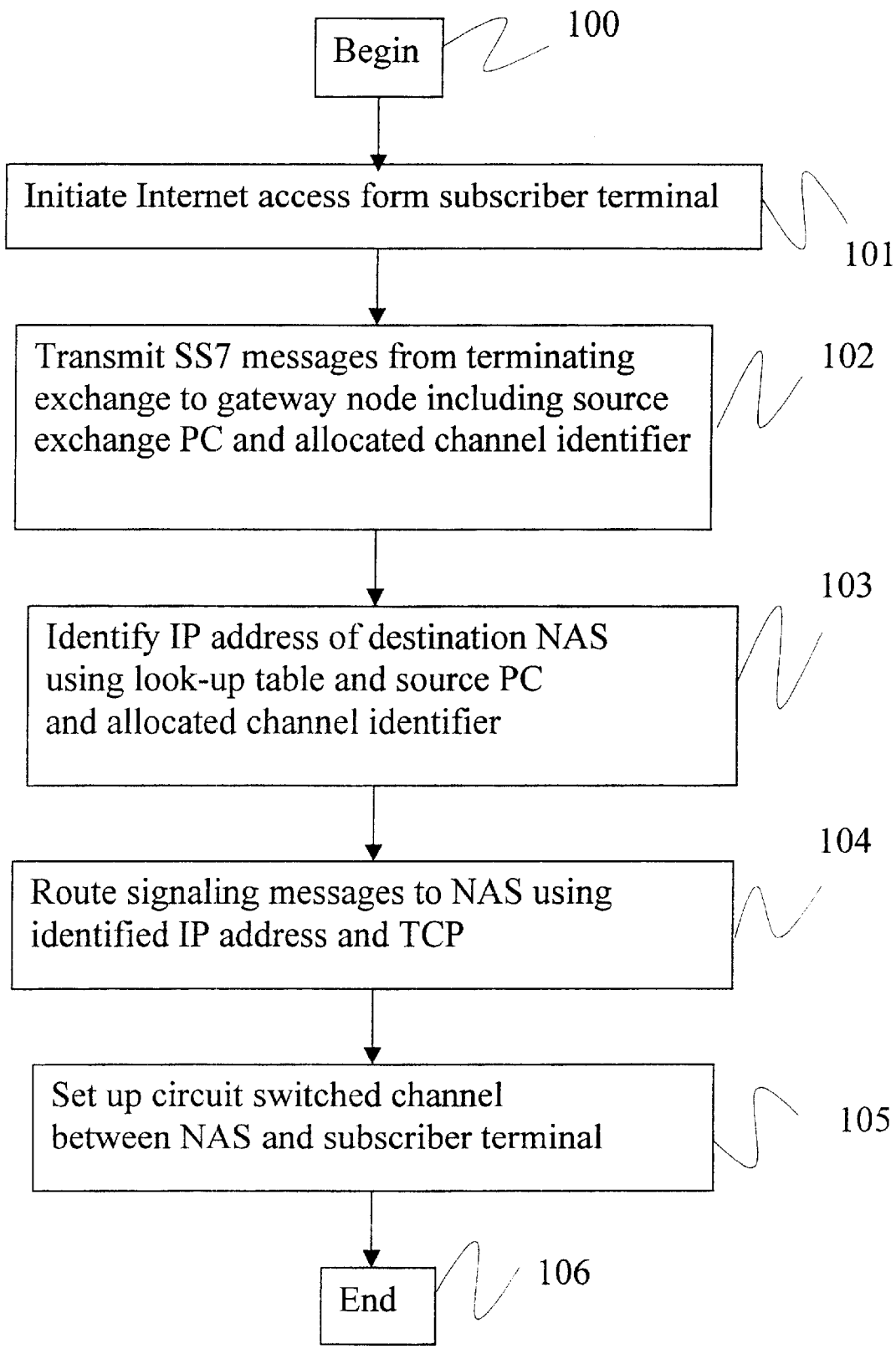
FIG. 2 is flow diagram illustrating the method of operation of the network of FIG. 1.

There is shown in FIG. 2 a flow chart containing the main steps (100 to 106) in the operation of the network of FIG. 1 vis-à-vis network signalling.

Figure 3:
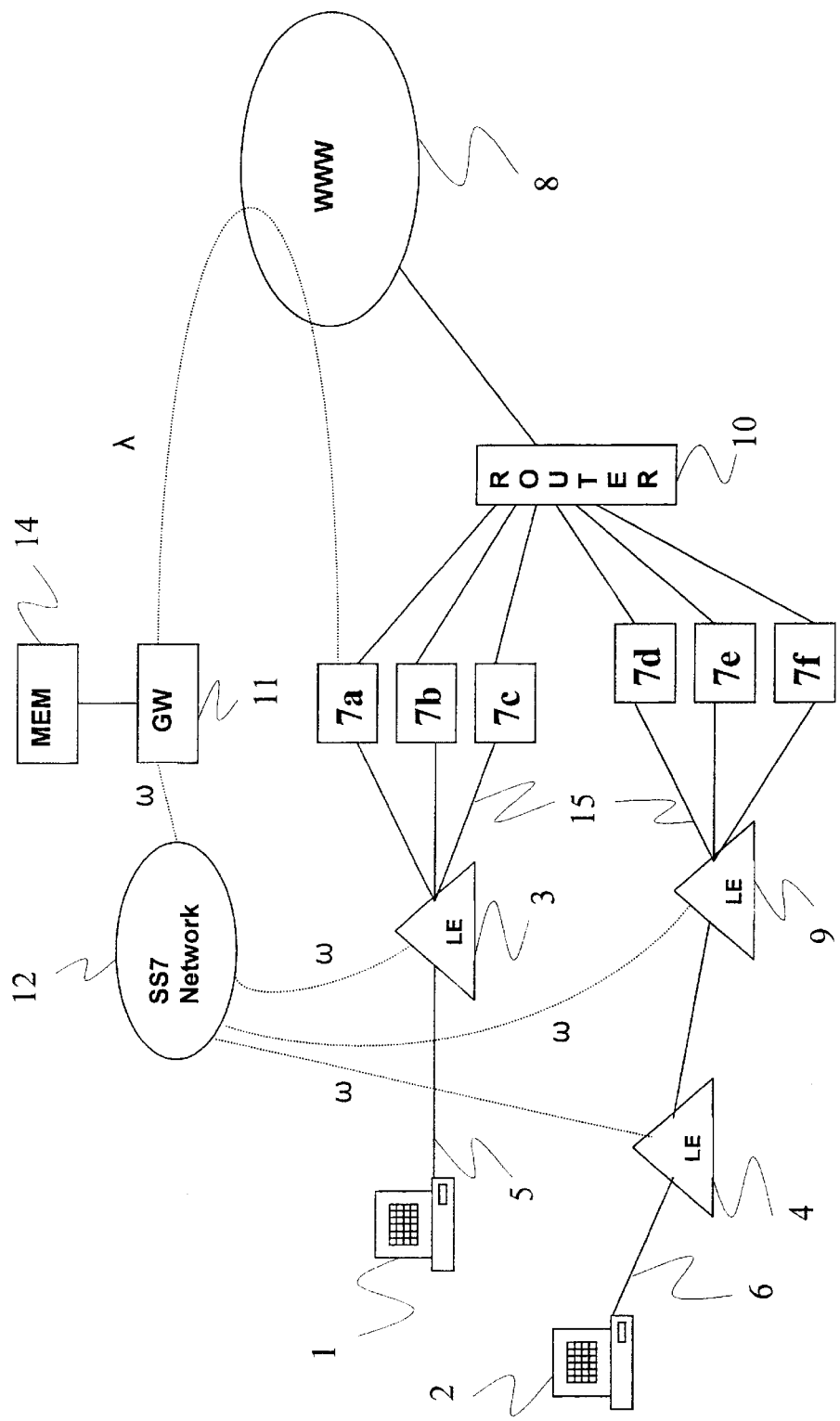
FIG. 3 illustrates a modification to the network of FIG. 1.

In the embodiment described above, the IP network 13 via which network signalling data λ is carried is isolated from the WWW 8. However, providing that security is not an issue, or can be ensured (e.g. by encryption), the signalling data k may be routed via the WWW 8. This is illustrated in FIG. 3 where features corresponding to those of FIG. 1 are identified by like reference numerals.

It will be appreciated by the person of skill in the art that various modifications may be made to the above described embodiments without departing from the scope of the present invention. For example, the functionality of the gateway node may be integrated into some other component of the system, for example an exchange of the system.

What is claimed is:

1. A method of signalling-in a telecommunications network to control a set of circuit switched channels between a network exchange and a data network access server (NAS), the method comprising:

transmitting signalling data between the exchange and a gateway node using-a circuit switched transmission protocol, the exchange and the gateway node being assigned respective Point Code addresses under said circuit switched protocol;

transmitting signalling data between the data NAS and the gateway node using a packet switched transmission protocol, the gateway node and the NAS being assigned respective addresses under said packed switched protocol;

providing a look-up table at the gateway node mapping the NAS packet switched protocol address to the exchange Point Code address and a set of identifiers corresponding to said set of channels; and receiving signalling data at the gateway node from the exchange, and routing the data to the NAS using the packet switched protocol address' for the NAS obtained from said look-up table using the Point Code address of the source exchange and a channel identifier conveyed with the signalling data.

2. A method according to claim 1 used to connect subscriber terminals to the Internet, where said packet switched transmission protocol is Internet Protocol (TCP/IP), and said data network addresses assigned to the gateway node and to the data network access server are IP addresses.

3. A method according to claim 1, wherein signalling data is transmitted between the gateway node and the network access server via the Internet.

4. A method according to claim 1, wherein signalling data is transmitted between the gateway node and the network access server via a closed connection comprising a data bus connecting the exchange to the network access server.

5. A method according to claim 1, wherein the signalling data is formatted for transmission by said circuit switched transmission protocol according to Signalling System 7 (SS7) protocol.

6. A method according to claim 1, wherein said gateway node is coupled to a plurality of exchanges, each exchange being coupled in turn to a set of NASs, and said look-up table contains a list of the NAS packet switched protocol addresses and, for each such address, the Point Code address of the associated exchange and the channel identifiers of the channels between the NAS and the exchange.

7. Apparatus for controlling a set of circuit switched channels between a network exchange and a data network access server (NAS), the apparatus comprising:
- a gateway node coupled between the NAS and the exchange;
- first network interface for transmitting signalling data between the exchange and the gateway node using a circuit switched transmission protocol , the exchange and the gateway node being assigned respective Point Code addresses under said circuit switched protocol;
- second network interface for transmitting signalling data between the data NAS and the gateway node using a packet switched transmission protocol, the gateway node and the NAS being assigned respective addresses under said packed switched protocol; and
- data storage means coupled to the gateway node and providing a look-up table mapping the NAS packet switched protocol address to the exchange Point Code address and a set of identifiers corresponding to said set of channels,
- wherein the gateway node is arranged in use to receive signalling data from the exchange, and to route the data to the NAS using the packet switched protocol address for the NAS obtained from said look-up table using the Point Code address of the source exchange and a channel identifier conveyed with the signalling data.

8. A gateway node of a telecommunications network, the gateway node being arranged to route signalling data to control a set of circuit switched channels between a network exchange and a data network access server (NAS), the gateway node comprising:
- first network interface for communicating signalling data between the gateway node and the exchange using a circuit switched transmission protocol, the exchange and the gateway node being assigned respective Point Code addresses under said circuit switched protocol;
- second network interface for transmitting signalling data between the gateway node and the NAS using a packet switched transmission protocol, the gateway node and the NAS being assigned respective addresses under said packet switched protocol;
- data storage means providing a look-up table mapping the NAS packet switched protocol address to the exchange Point Code address and a set of identifiers corresponding to said set of channels; and
- routing means for routing signalling data received form the exchange to the NAS using the packet switched protocol address for the NAS obtained from said look-up table using the Point Code address of the source exchange and a channel identifier conveyed with the signalling data.

* * * * *